United States Patent
Brooks

(10) Patent No.: US 7,209,953 B2
(45) Date of Patent: Apr. 24, 2007

(54) E-MAIL SYSTEM USING ATTACHMENT IDENTIFIER GENERATED AT ISSUER DEVICE FOR RETRIEVING APPROPRIATE FILE VERSION FROM E-MAIL'S ISSUER

(76) Inventor: Mark Brooks, 1 Marlborough Street, Richmond Hill, ON (CA) L4B-2W7

( * ) Notice: Subject to any disclaimer, the term of this patent is extended or adjusted under 35 U.S.C. 154(b) by 886 days.

(21) Appl. No.: 10/438,806

(22) Filed: May 16, 2003

(65) Prior Publication Data

US 2004/0117456 A1    Jun. 17, 2004

(30) Foreign Application Priority Data

Dec. 12, 2002  (CA) .................................. 2414154

(51) Int. Cl.
G06F 15/16 (2006.01)
(52) U.S. Cl. ...................................... 709/206; 709/219
(58) Field of Classification Search ................ 709/206, 709/219, 229
See application file for complete search history.

(56) References Cited

U.S. PATENT DOCUMENTS

| | | | |
|---|---|---|---|
| 5,771,355 A | 6/1998 | Kuzma | |
| 5,781,901 A | 7/1998 | Kuzma | |
| 5,903,723 A | 5/1999 | Beck et al. | |
| 6,016,478 A | 1/2000 | Zhang et al. | |
| 6,073,142 A | 6/2000 | Geiger et al. | |
| 6,332,164 B1 | 12/2001 | Jain | |
| 6,601,102 B2* | 7/2003 | Eldridge et al. | 709/229 |
| 6,687,741 B1* | 2/2004 | Ramaley et al. | 709/206 |
| 6,993,559 B2* | 1/2006 | Jilk et al. | 709/206 |
| 7,039,678 B1* | 5/2006 | Halahmi et al. | 709/206 |
| 7,089,287 B2* | 8/2006 | Bellotti et al. | 709/206 |
| 2002/0010746 A1* | 1/2002 | Jilk et al. | 709/206 |
| 2003/0023695 A1* | 1/2003 | Kobata et al. | 709/206 |
| 2003/0126214 A1* | 7/2003 | Oliszewski | 709/206 |
| 2003/0131062 A1* | 7/2003 | Miyashita | 709/206 |
| 2003/0208546 A1* | 11/2003 | DeSalvo et al. | 709/206 |

* cited by examiner

Primary Examiner—Le Hien Luu
(74) Attorney, Agent, or Firm—Robert F. Delbridge

(57) ABSTRACT

The present invention provides a system and method for transmitting a file associated with an email message from an issuer device in a network to a recipient device in the network. The email message and file are generated by the issuer device in response to a request received at the issuer device. The system comprises a proxy server in the network, processing software operating on the proxy server and transmission software operating on the issuer device. The transmission software operating on the issuer device has an attachment selection module and an attachment transmission module. The attachment selection module generates an attachment identifier related to the file, the attachment identifier identifies the issuer device, a version of the file and a location in the network for the proxy server. The attachment selection module further generates an email for transmission to the recipient device, the email having the attachment identifier attached thereto. The attachment transmission module forwards the version of the file towards the recipient device in response to a transmission request received from the proxy server. The processing software operating on the proxy server has request processing module and an issuer interface module. The request processing module processes a received request from the recipient device to process the attachment identifier. The issuer interface module generates and sends the transmission request to the issuer device in response to the received request, the transmission request providing the attachment identifier to the issuer device.

17 Claims, 5 Drawing Sheets

E-MAIL SYSTEM USING ATTACHMENT IDENTIFIER GENERATED AT ISSUER DEVICE FOR RETRIEVING APPROPRIATE FILE VERSION FROM E-MAIL'S ISSUER

FIELD OF THE INVENTION

The present invention relates to a system and method for effecting email transmissions with attachments in a network environment. In particular, the invention provides a system and method for transmission of email attachments of any size securely and privately within the Internet.

BACKGROUND OF INVENTION

Computers, and their users, are commonly linked together via communication networks, such as the Internet. Email transmissions between users provide a method of transmitting from an issuer to a recipient data, stored as a file, which is attached as an attachment to the email and sent directly with it.

Known methods of attaching a file to an email message have many disadvantages, originating from size restrictions of attachments for emails. Furthermore, these methods for transmitting email are not secure, do not provide transmission guarantees, do not provide real-time transmission and have changing attachment size limits. In particular, when a "large" attachment is provided with an email or when the email contains sensitive information, current email transmission techniques do not sufficiently addresses these issues. The present email transmission technology may be likened to a postal service offering to deliver only small postcards that anyone in the postal office can read while in transit.

Presently, most email servers have set size limits on emails that are sent to, from or relayed by such servers. The limitations vary greatly from server to server, with limits being as low as less than 1 megabyte to 10 megabytes or more. Given these varying limits, it is not uncommon for users of email to send an email with a large file attachment, and then having that email rejected by the recipient server as to being too large to process. Under some conditions the email issuer may not even receive a rejection notice, or such notice may arrive hours after the email was first sent.

Further, an email is often sent or relayed through third party email servers where it may be intercepted and captured by unauthorized parties. Since the vast majority of email being sent is in plain text, unless the file attachment is previously password protected or encrypted, all information contained in the email is susceptible to being intercepted without the knowledge of either the issuer or recipient of the email.

Recently, Virtual Private Networks ("VPNs") have been deployed which provide the ability to transmit large volumes of data securely over the Internet. Many VPNs provide a variety of capital-intensive solutions to companies that wish to give users access from known remote personal computers ("PCs") to an internal corporate local area network ("LAN") over the Internet. However, such VPN access lacks the ease of use and universality of existing email interfaces. Further, current VPN implementations are limited by the security barriers erected on the Internet to protect a user's PC and an internal LAN from viruses, hackers and other security risks. These barriers include firewalls, network address translation ("NAT") systems and related security structures that an average user of a VPN or the Internet cannot control. Thus, current VPN implementations focus on enabling network access from known remote locations (typically employees' PC's) to a company's internal LAN by reconfiguring a number of security barriers, such as a corporate firewall, and installing specialized software or hardware, but do not provide universal communications between users and the secured PC's.

As a result, although unsecured and limited in size, email remains the preferred means of data transmission for corporate Internet users in communications to external users, such as business partners, suppliers, or clients.

Hence there is a need for a flexible, user friendly and efficient system and method to transmit file attachments of an email securely across a computer network, such as the Internet.

SUMMARY OF THE INVENTION

In a first aspect, a system for transmitting a file associated with an email message from an issuer device in a network to a recipient device in the network is provided. The email message and file are generated by the issuer device in response to a request received at the issuer device. The system comprises a proxy server in the network, processing software operating on the proxy server and transmission software operating on the issuer device. The transmission software operating on the issuer device has an attachment selection module and an attachment transmission module. The attachment selection module generates an attachment identifier related to the file, the attachment identifier identifies the issuer device, a version of the file and a location in the network for the proxy server. The attachment selection module further generates an email for transmission to the recipient device, the email having the attachment identifier attached thereto. The attachment transmission module forwards the version of the file towards the recipient device in response to a transmission request received from the proxy server. The processing software operating on the proxy server has a request processing module and an issuer interface module. The request processing module processes a received request from the recipient device to process the attachment identifier. The issuer interface module generates and sends the transmission request to the issuer device in response to the received request, the transmission request providing the attachment identifier to the issuer device.

The system may have the attachment transmission module forwarding the version of the file towards the recipient device through the proxy server. Further, the processing software may have an attachment management module which receives the version of the file from the issuer device and forwards the version of the file to the recipient device.

In the system the attachment identifier may provide a uniform resource locator to identify the location of the proxy server in the network.

In the system, the attachment transmission module may utilize a TCP/IP port which bypasses data security interfaces associated with said issuer device to transmit the file to the recipient device.

In the system the TCP/IP port may be selected from a group consisting of port 80 and port 443.

In the system, the issuer device may connect to the proxy server by a polling transaction through the TCP/IP port.

In the system, the attachment identifier may be encrypted by the attachment selection module.

In the system, the issuer interface module may further evaluate a set of access conditions related to the file attachment to the recipient device.

In the system, the set of access conditions may include at least an access password, download attempt limit and an expiry date.

In a second aspect, a method for transmitting a file associated with an email message from an issuer device in a network to a recipient device in the network using a proxy server is provided. The email message and file are generated by the issuer device in response to a request received at the issuer device. The method comprises the sequential steps of (a) generating an attachment identifier for transmission with the email message to the recipient device, the attachment identifier identifying the issuer device, a version of the file and a location of the proxy server in the network; (b) receiving at the proxy server a request from the recipient device to process the attachment identifier; (c) transmitting a request from the proxy server to the issuer device for a copy of the version of the file identified in the attachment identifier; (d) transmitting the copy of the version of the file from the issuer device towards the recipient device, in response to a transmission request received from the proxy server, In the method, in step (d), the copy of the version of the file may be transmitted from the issuer device to the proxy server. Further, the method may include step (e), wherein the copy of the version of the file is received by the proxy server then transmitted from the proxy server to the recipient device.

In the method, the attachment identifier may provide a uniform resource locator to identify the address of the proxy server in the network.

In the method the file may be transmitted through a TCP/IP port which bypasses data security interfaces associated with the issuer device.

In the method, the TCP/IP port may be selected form a group consisting of port 80 and port 443.

In the method, the attachment identifier may be encrypted.

In the method, in the step (e), prior to the transmitting of the copy of the version of the file, access parameters to the copy of the version of the file which were provided by the recipient to the proxy server may be evaluated and transmitted if they are deemed acceptable by the proxy server.

In the method, the access parameters may include at least an access password, a number of downloads allowed and an expiry date.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention.

DETAILED DESCRIPTION OF THE EMBODIMENTS

Figure 1:
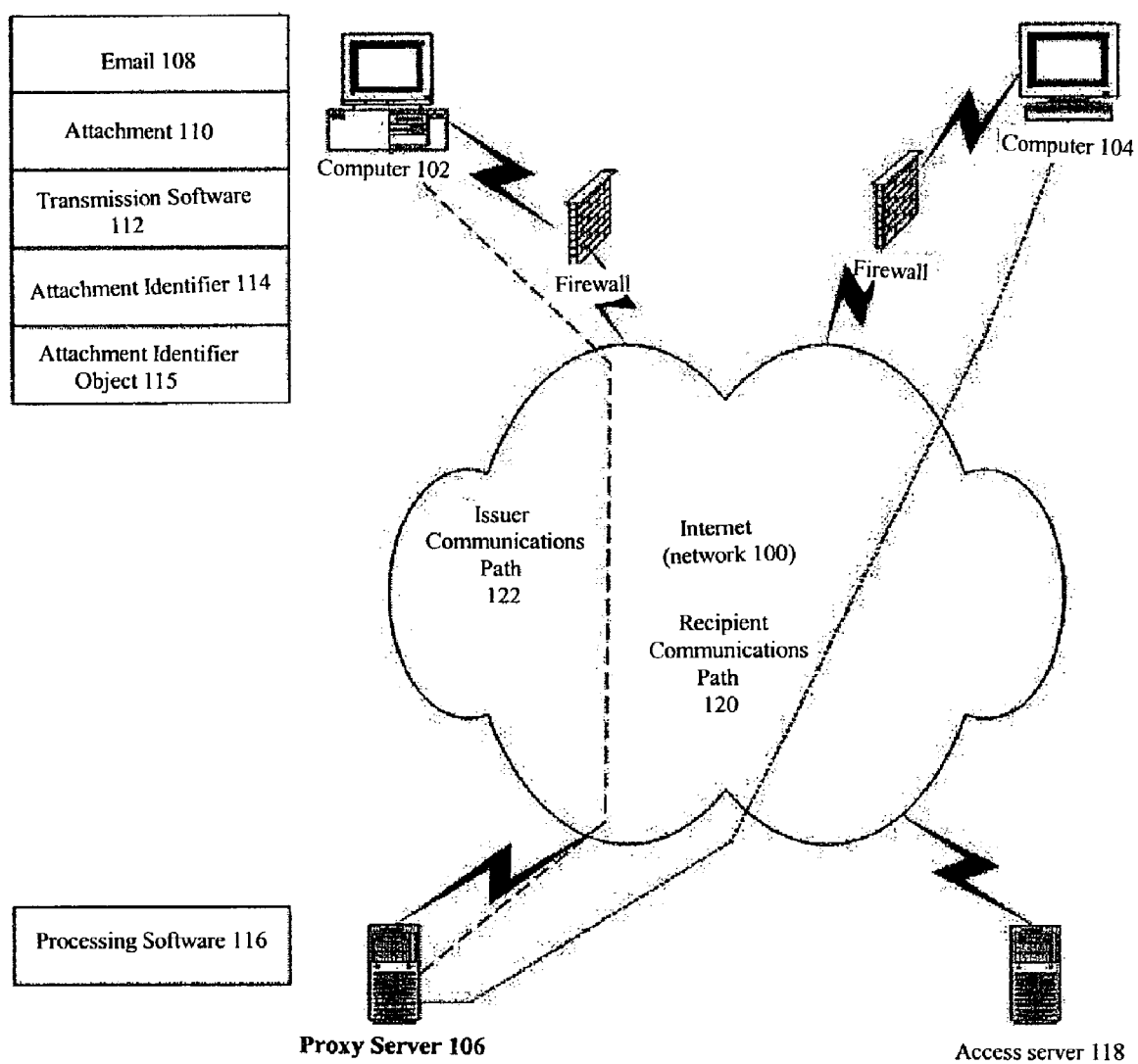
FIG. 1 is a block diagram of a network incorporating an embodiment of the invention, the network comprising computers, a proxy server for processing email attachments and an access server.

The description which follows, and the embodiments therein, are provided by way of illustrating an example, or examples, of particular embodiments of principles of the present invention. These examples are provided for the purpose of explanation, and not limitations, of those principles. In the description, which follows, like elements are marked throughout the specification and the drawings with the same respective reference numerals.

Referring to FIG. 1, in a prior art email transmission system, network 100 provides a data communication system which enables computer 102 to transmit and receive data from computer 104. Attachment 110 is generated from a source file at a time between the time when email 108 is generated to the time when email 108 is transmitted with attachment 110 from computer 102. When computer 102 is to transmit email 108 with attachment 110, both email 108 and attachment 110 are provided together from computer 102 through network 100 to computer 104. A prior art email server (not shown) may assist the forwarding of the email 108 and attachment 110 from its source to its destination. It will be appreciated that when email 108 is transmitted with attachment 110, transmission throughput and storage issues relating to the combined size of email 108 and attachment 110, as described earlier, may be encountered in network 100, the prior art email server, and computer 104.

In contrast to prior art email transmission systems, for an embodiment, computer 102 (as an issuer device), computer 104 (as a recipient device), network 100 and proxy server 106 operate together, collectively separating email 108 from attachment 110 and allowing computer 104 to directly access attachment 110 from computer 102 without having to send attachment 110 with email 108. It will be appreciated that the separation of email 108 from attachment 110 also permits attachment 110 to be generated from a version of a source file separately from email 108, even after email 108 is generated and transmitted from computer 102. As such, the embodiment enables the attachment to reflect changes made to the file after email 108 is sent to computer 104. In the embodiment, once email 108 is generated, a user at computer 102 may further update the source file and when a recipient requests the version of the source file, if the issuer allowed the recipient to get access to the most recent version of the file, then the most recent version is provided to the recipient. Alternatively, if the issuer established that the recipient had access to the version of the file which existed when the email was generated, then that version of the file would be provided to the recipient.

Referring to FIG. 1, detail on elements of an embodiment operating on network 100 is provided. For the embodiment, network 100 may be the Internet and computers 102 and 104 may be typical personal computers (PCs). The embodiment provides proxy server 106, which, as described below, acts as a proxy system for forwarding information regarding attachments for emails sent from, for example, computer 102 to computer 104. The embodiment also provides access server 118, which, as described below, approves or disapproves transmission of attachment 110 through proxy server 106. While in FIG. 1 only computers 102 and 104 are shown, it will be appreciated that in other systems more computers may be associated with network 100. Furthermore, while this example only illustrates the attachment and transmission of a single file, multiple files may be attached and transferred pursuant to this embodiment.

For the embodiment, when email 108 is generated by computer 102 and has attachment 110 associated with it, email 108 and attachment 110 are not combined and sent together, as in prior art systems. Instead, email 108 and attachment 110 are separately processed in two phases.

In the first phase, when email 108 is generated by a user at computer 102, attachment identifier 114 and attachment identifier object 115 are generated. Attachment identifier 114 is a data tag which uniquely identifies each of proxy server 106, computer 102, attachment identifier object 115 and attachment 110 to elements in network 100. Attachment identifier object 115 is a data structure that stores information and parameters relating to attachment 110 and the processing thereof in the second phase, such as a file name of attachment 110, a maximum number of transmissions permitted, and an access password for attachment 110. Attachment identifier 114, instead of attachment 110, is attached to email 108 which is sent from computer 102 to computer 104 through network 100 via known email transmission methods. Since attachment identifier 114 is of a relatively small and constant size, transmission of email 108 with attachment identifier 114 through current email transmission systems do not encounter throughput and storage issues that may arise if email 108 would have been transmitted with attachment 110. After email 108 is sent, computer 102 establishes issuer communications path 122 with proxy server 106 through network 100, and waits for initiation of the second phase.

In the second phase, once email 108 with its attachment identifier 114 is received at computer 104, when a recipient at computer 104 opens email 108, using email processing software, such as Microsoft Outlook (trademark of Microsoft Corporation, Richmond, Wash.), the recipient is presented with attachment identifier 114. By having attachment identifier 114, the recipient has knowledge of the exact location and identification of attachment 110. To access attachment 110, first, computer 104 establishes recipient communications path 120 to proxy server 106 through network 100. Attachment identifier 114 is then sent from computer 104 to proxy server 106 via recipient communications path 120. Proxy server 106 accesses information contained in attachment identifier 114 to uniquely identify issuer communication path 122 and computer 102. Then, attachment identifier 114 is further sent from proxy server 106 to computer 102 via issuer communication path 122. Upon receipt, computer 102 then uses the information contained in attachment identifier 114 to identify and locate attachment identifier object 115 and attachment 110 stored at computer 102. Computer 102 then transmits attachment identifier object 115 to proxy server 106, and proxy server 106 presents the information and parameters contained in the data structure of attachment object 115 to the recipient at computer 104 through recipient communications path 120 for acceptance. If the recipient accepts the information, and other parameters of attachment identifier object 115 are satisfied (such as an access password being correctly entered by the recipient, as described below), then computer 102 transmits attachment 110 to computer 104 through the issuer communications path 122 and recipient communications path 120 between computer 102 and proxy server 106, and between proxy server 106 and computer 104 respectively. For the embodiment, recipient communications path 120 may be achieved through a secure hypertext transmission protocol ("HTTPS") connection utilizing a web browser program (not shown) installed on computer 104 and an Internet information server program (not shown) installed on proxy server 106. Through the HTTPS connection, computer 104 may send attachment identifier 114 to proxy server 106, and receive attachment 110 through the web browser program at computer 104 by utilizing the multipurpose Internal mail extensions ("MIME") abilities of the web browser. It will be appreciated that by utilizing the MIME abilities of the web browser and the HTTPS connection, no special software is required to be installed on computer 104.

At computer 102 transmission software 112 is installed which augments the email system used on computer 102 to create email 108 with attachment 110. Transmission software 112 analyzes attachment 110 to generate attachment identifier 114 and attachment identifier object 115, and when email 108 is sent from computer 102, attachment identifier 114, instead of attachment 110, is sent with email 108 to computer 104 through known methods of email transmission through network 100. As described below, attachment identifier 114 includes a key variable generated by transmission software 112 based on a randomly generated number and the media access control ("MAC") address of the network card of computer 102. By utilizing the key variable, attachment identifier 114 contains sufficient information to uniquely identify computer 102 in network 100.

For the embodiment, in proxy server 106 processing software 116 operates to maintain communications with computer 102 and to co-ordinate communications and transfers of information with computer 104. When computer 104 begins access of attachment 110 via the proxy system provided by proxy server 106, recipient communications path 120 is established between computer 104 and proxy server 106 through network 100, and information contained in attachment identifier 114, among other information, is sent from computer 104 to proxy server 106. Processing software 116, using the information from attachment identifier 114, identifies attachment 110 as stored at computer 102. Using issuer communications path 122, attachment identifier 114 is then sent from proxy server 106 to computer 102, where transmission software 112 further utilizes information contained in attachment identifier 114 to identify attachment identifier object 115 and attachment 110 stored at computer 102. Attachment identifier object 115 is sent to proxy server 106 through issuer communications path 122, and as described below, if the information contained in attachment identifier object 115 is accepted by the recipient at computer 104 and the other parameters in attachment identifier object 115 are satisfied, then in conjunction with processing software 116, transmission software 112 transmits attachment 110 as a series of data blocks from computer 102 to proxy server 106 through issuer communications path 122. Processing software 116 then redirects each data block from proxy server 106 to computer 104 through recipient communications path 120. Thus, computer 102 is able to access attachment 110 directly from computer 102 via proxy server 106.

Access server 118 determines whether computer 104 may access attachment 110 via proxy server 106. When computer 104 attempts to access attachment 110, processing software 116 communicates with access server 118 through network 100 to verify whether certain credit/debit conditions of a user account (not shown) associated with attachment identifier 114 are satisfied. If these conditions are satisfied, then access server 118 provides approval to processing software 116, and access to attachment 110 as described above is permitted. Otherwise, processing software 116 denies access to attachment 110 and provides an error message to computer 104 through recipient communications path 120.

Figure 2:
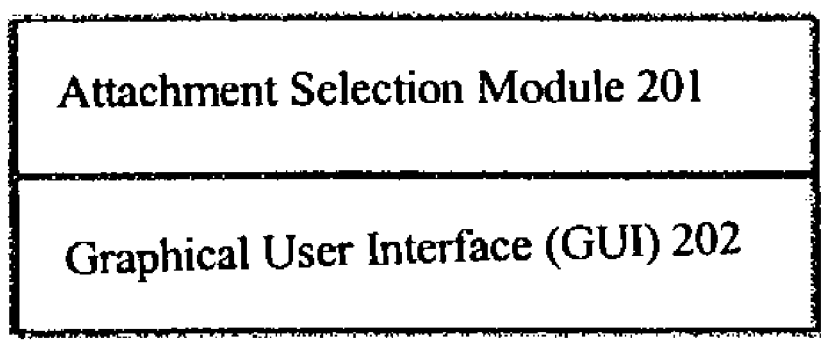
FIG. 2 is a block diagram of an email attachment transmission software operating on a computer of FIG. 1.
Figure 2:
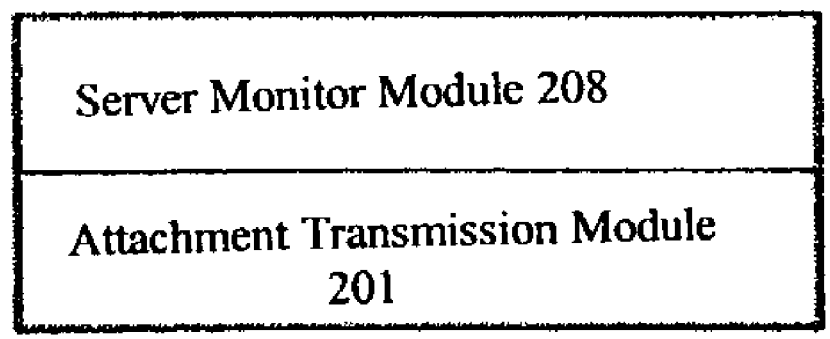
Figure 2:
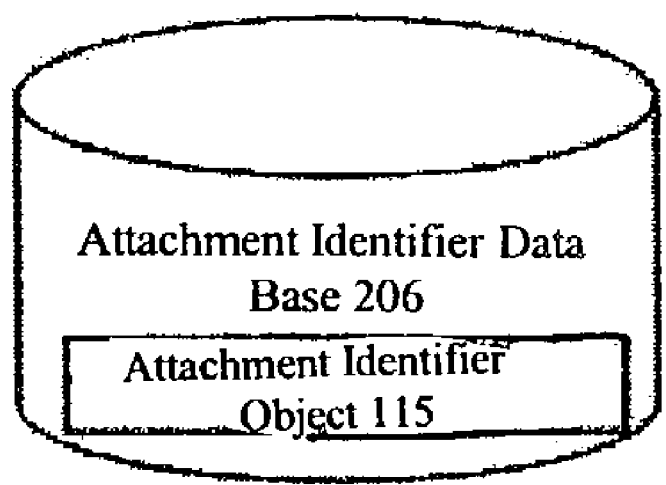

Referring to FIGS. 1 and 2, further detail on transmission software 112 is provided. Therein, transmission software 112 comprises attachment selection module 201 having graphical user interface 202, attachment identifier database 206, server monitor module 208, and attachment transmission module 210. Graphical user interface 202 is a data entry interface for a user at computer 102 to enter information and parameters relating to attachment 110. Graphical user interface 202 provides a series of dialogs that steps the user through attachment selection module 201, which provides a process of selecting a data file attachment as attachment 110 and entering user selected options such as an expiry date and an access password relating to attachment 110. A dialog box also enables the user to select the version of the source file which is to be associated with the email. Further detail on the processing of the version information is provided later. The information and parameters entered by the user are processed by attachment selection module 201 and used to generate attachment identifier 114, attachment identifier object 115 and email 108. Attachment selection module 201 then invokes the email system of computer 102 to transmit email 108 with attachment identifier 114, and stores attachment identifier object 115 in attachment identifier database 206. Server monitor module 208 establishes and maintains issuer communications path 122 between computer 102 and proxy server 106 while attachment identifier 114 is outstanding, as identified by data parameters in attachment identifier object 115 indicating that transmission may be permitted. When a portion of attachment identifier 114 is received by transmission software 112 from proxy server 106 through issuer communications path 122, server monitor module 208 invokes attachment transmission module 210 to handle the request for attachment 110 and attachment identifier object 115, as identified by attachment identifier 114. Attachment transmission module 210 first validates attachment identifier 114, retrieves attachment identifier object 115 from attachment identifier database 206, and then transmits attachment identifier object 115 to serve 106 through issuer communications path 122. As described in greater detail below, attachment identifier object 115 is used by processing software 116 at proxy server 106 to gather any user validation information, such as an access password, and to generate derived attachment identifier object 406 (FIG. 4, below) before returning to attachment transmission module 210 a valid transmission request through issuer communications path 122. Derived attachment identifier object 406 is a data structure that is created by processing software 116 from attachment identifier object 115 and the information contained therein is updated to reflect the transmission status of attachment 110, as described in greater detail below. After receiving the valid transmission request, attachment transmission module 210 transmits attachment 110 to server 116 as a series of discrete data blocks through issuer communications path 122. This transmission may be "paced" by transmission module 210 (that is, slowed down) to ensure that no more that a configurable number of data blocks is stored on proxy server 106 before the data blocks are redirected by processing software 116 from proxy server 106 to computer 104. Each data block is sent as a discrete transmission, so if the transmission is interrupted, only one block is affected, and attachment transmission module 210 will retry the transmission again for a configurable number of times. If transmission is still not successful after the specified number of times, then attachment transmission module 210 will stop the transmission and will await a retransmit request from processing software 116. As described below, derived attachment identifier object 406 (FIG. 4) is updated by processing software 116 as to the status of data blocks that is received at proxy server 106, and hence the data block for which transmission was not successful is recorded in derived attachment identifier object 406. The retransmission request sent by processing software 116 includes derived attachment identifier object 406, and after it is received by transmission software 112, attachment transmission module 210 analyzes derived attachment identifier object 406 to determine the data block in the series that was not successfully sent, and continues to transmit the series of data blocks, starting at the data block indicated by derived attachment identifier object 406 as the one for which transmission was not successful. Transmission module 210 also updates attachment identifier database 206 from time to time with the progress of the transmission of attachment 110, and at the completion of the transmission, attachment transmission module 210 contacts access server 118 to await confirmation that attachment 110 has been successful received by computer 104, as described below.

It will be appreciated that since attachment 110 is transmitted as a series of discrete data blocks from computer 102 to proxy server 106, if the transmission over issuer communications path 122 is interrupted, then only the data block under transmission at the time of interruption is lost. Data blocks that were previously transmitted successfully are unaffected, and retransmission of the series of data blocks may begin with the data block that was lost due to the interruption, rather than with the first data block that was sent. Therefore, attachment transmission module 210 also provides for the efficient retransmission of attachment 110 if there was a transmission interruption over issuer communications path 122.

For the embodiment, transmission software 112 preferably operates on computer 102 in the background. For example, transmission software 112 may run as a background, unattended process, such as a "tray process" or a "service process" in a Microsoft Windows (trademark of Microsoft Corporation, Richmond, Wash.) operating system. It will be appreciated that transmission software 112 may also partially operate as a foreground application that is invoked at computer 102 when email 108 and attachment 110 are created and sent.

For the embodiment, transmission software 112 provides separate transmission of email 108 and attachment 110 as follows. Email 108 and attachment identifier 114 are generated at computer 102 by transmission software 112 through attachment selection module 201. Graphical user interface 202, provided by attachment selection module 201, provides a user at computer 102 with an interface to enter information and parameters to be associated with attachment 110, such as a date and time when access to attachment 110 will expire, and an access password. As described in greater detail below, attachment identifier 114 includes information that uniquely identifies attachment identifier object 115 and attachment 110 to elements in network 100. When email 108 is sent from computer 102 to computer 104, attachment identifier 114 is sent with email 108 instead of attachment 110. Attachment identifier object 115 is also recorded into attachment identifier database 206, as described above, and attachment identifier 114 may then be used by computer 104 to retrieve attachment 110 from computer 102.

In prior art network and VPN implementations, computers secured within different networks cannot communicate directly with each other, unless the computers are specifically configured to do so through a specific VPN implementation. Security barriers, such as firewalls, erected by different network entities, serve to block communications between computers in these different networks. However, networks commonly permit data communications from computers secured within a network to access Internet data traffic through several specific data ports in the transmission control protocol/Internet protocol ("TCP/IP") architecture.

For the embodiment, server monitor module 208 establishes issuer communications path 122 between computer 102 and proxy server 106 through an Internet data stream via a TCP/IP port normally reserved for Internet data traffic, and thus provides a continuous connection between computer 102 and proxy server 106 to attempt to avoid interaction with data security interfaces that may be present between computer 102 and proxy server 106, such as firewalls or NAT systems. However, network security is not compromised through issuer communications path 122, since only attachment 110 can be accessed on computer 102 via attachment identifier 114 and such access is solely initiated and controlled by computer 102 and may also be password protected, as described below. The transmission of email 108 separately from attachment 110 provides a more secure delivery method for attachment 110 than prior art systems of email and file attachment transmission involving the transmission of email 108 together with attachment 110, since the transmission provided by the embodiment is encrypted, point to point, and strictly controlled via an access count, an expiry date, and/or an access password that is controlled by a user at computer 102, as described below. To provide for issuer communications path 122 through a TCP/IP port normally reserved for Internet traffic, the Internet data stream may, for example, be a hypertext transmission protocol ("HTTP") or secure hypertext transmission protocol ("HTTPS") stream, and the TCP/IP port used may be port 80 or port 443, depending on whether the connection is to be achieved through the secure socket layer ("SSL"). Issuer communications path 122 between computer 102 and proxy server 106 is continuous, and is provided by server monitor module 208 continuously polling processing software 116 for receipt of any requests for attachment 110, as identified by attachment identifier 114 being present in issuer data queue 404 (FIG. 4, below), maintained by processing software 116 at proxy server 106 for server monitor module 208 to poll. Issuer data queue 404 is a data structure that contains all data requests to be sent to or received from computer 102. The polling transaction by server monitor module 208 would typically have a very long time out, preferably at least 2 minutes 30 seconds. Once the time out is reached, server monitor module 208 may immediately re-poll issuer data queue 404. When attachment identifier 114 is placed in the issuer data queue 404 by processing software 116, the polling transaction by server monitor module 208 will return a request for attachment identifier object 115 and attachment 110 to transmission software 112 for processing. This polling approach provides a continuous connection that is very similar to a connection achieved through a standard TCP/IP client-server architecture connection. However, since transmission software 112 achieves a connection via a TCP/IP port normally reserved for outgoing web server data traffic, the connection will not be inhibited by firewalls and other security barriers. In effect, if computer 102 is connected to network 100, then transmission software 112 will be able to communicate with proxy server 106 by having issuer communications path 122 between computer 102 and proxy server 106 appear as permitted, normal outbound Internet browser traffic to the security barrier(s) between computer 102 and proxy server 106. Although data transmission under this method may be less efficient than traditional TCP/IP client-server architectures, this approach enables transmission software 112 to access proxy server 106 through network 100, regardless of the security barriers that reside between computer 102 and proxy server 106.

Transmission software 112 also provides server monitor module 208, which serves to respond to a request for attachment 110 and attachment identifier object 115 from processing software 116. Server monitor module 208 also maintains communications with processing software 116 on proxy server 106. When computer 104 is requesting attachment 110, attachment identifier 114 is sent to proxy server 106 from computer 104 and then proxy server 106 presents attachment identifier 114 to transmission software 112, as described below, in order to retrieve attachment identifier object 115 and attachment 110. Server monitor module 208, upon receiving attachment identifier 114, invokes attachment transmission module 210. Transmission module 210 retrieves attachment identifier object 115 from attachment identifier database 206 in computer 102 and forwards attachment identifier object 115 to proxy server 106 via issuer communications path 122. At proxy server 106, processing software 116 evaluates information and parameters in attachment identifier object 115 (such an access password to be entered) against values received by processing software 116 (such as an entered access password). If the evaluation is acceptable, then a transmission request module in the processing software 116 generates and send a request for attachment 110 to computer 102. When computer 102 receives the request, attachment transmission module 210 preferably validates the request by evaluating one or more data fields in attachment identifier object 115 (such as checking an expiry time and date field against a system clock on computer 102), and then retrieves the copy of the version of the source file (previously identified by the user) from its storage location, marks it as attachment 110 and transmits attachment 110 in discrete data blocks to proxy server 106 for delivery to computer 104 pursuant to the proxy system of proxy server 106, as described above. Attachment 110 may also be compressed, using techniques known in the art.

In an alternate embodiment, proxy server 106 operates as a broker between computer 102 and computer 104 for attachment 110, and attachment 110 is sent between computer 102 and computer 104 without traversing proxy server 106.

Figure 3:
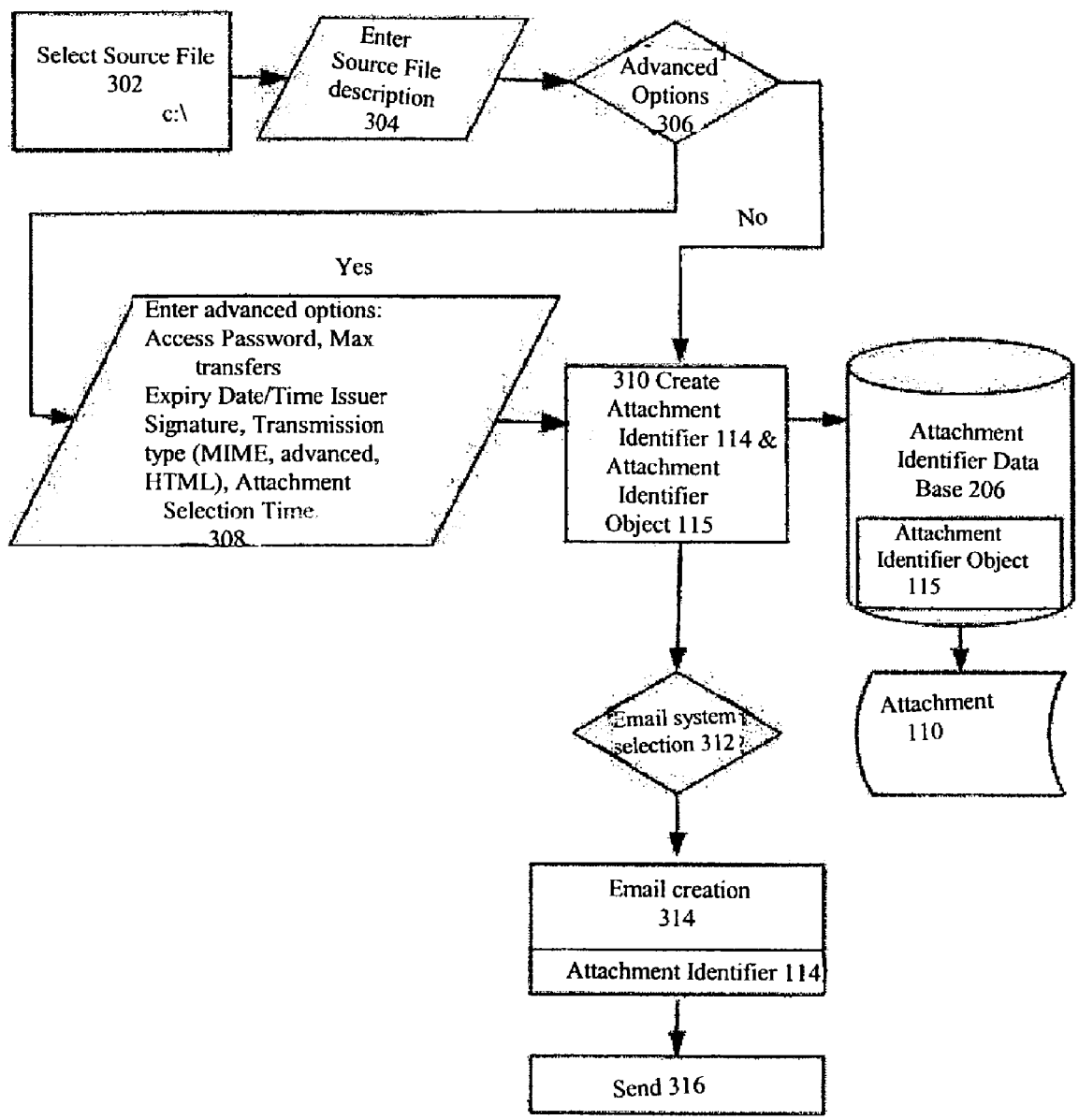
FIG. 3 is a block diagram of showing an exemplary operation in an attachment selection program module of the email attachment transmission software of FIG. 2.

Referring to FIG. 3, further detail on attachment selection module 201 of transmission software 112 (FIG. 1) is provided. For the embodiment, the creation of email 108 containing attachment identifier 114 in the place of attachment 110 is undertaken by attachment selection module 201 through information and data parameters received through graphical user interface 202. Graphical user interface 202 operates in a series of dialogs starting with the selection by a user at computer 102 of a source file in dialog 302. This is followed by a source file description dialog 304, in which the user enters a brief description of the source file. The user can then choose to set advanced options in dialogs 306 and 308, which may include an access password, a maximum number of transmissions, an expiry date and/or time, an issuer signature, a transmission type (such as MIME, advanced, or html, as described below), as well as an attachment selection time. The attachment selection time is a date and time value entered by the user, which is used by transmission software 112 to generate attachment 110 from the source file at the date and time specified. For example, the attachment selection time may be set to immediate, when attachment identifier object 115 is created, or each time attachment identifier 114 is received by transmission software 112. Next, in dialog 310, attachment identifier object 115 is created and stored in attachment identifier database 206, and if the attachment selection time is set to immediate, attachment 110 is also generated from the source file at this time. In the preferred embodiment, the attachment selection time is set to immediate by default. Alternatively, the embodiment may present the user with a choice between providing a static version of the source file, predicated on the time of transmission of email 108 or simply the most recent version of the source file. Once attachment 110 is generated from the source file, it is preferably stored locally at computer 102 until processing software 116 requests it. If the user wishes to have the recipient have access to the most recent version of the source file, then attachment 110 preferably is generated, as a copy of the source file, only after the recipient has activated the link associated with attachment identifier 114. If the user wishes to send a static version of the file, then attachment 110 may be generated, as a copy of the source file, at about the time of generation of email 108. Finally dialog 312 allows the user to select an email system that will be used, and email 108 is generated with attachment identifier 114 (dialog 314). In dialog 316, email 108, with attachment identifier 114, is sent by the user from computer 102 through the selected email system.

After email 108 is sent to computer 104 with attachment identifier 114, attachment identifier 114, along with attachment identifier object 115, provide computer 104 with access to attachment 110 through the proxy system of proxy server 106 (FIG. 1). Attachment identifier 114 and attachment identifier object 115 are also used to provide secured access to attachment 110, as described below.

The data structure of attachment identifier 114 includes information that uniquely identifies computer 102, attachment identifier object 115, and proxy server 106 (FIGS. 1 and 2). Through attachment identifier object 115, attachment 110 is uniquely identified, secured and accessed for transmission. For example, attachment identifier 114 may appear as:

https://filecourier.com/FC/D/
   d.aspx?FT=bbc87c94a19dc19d81990102

In this example, attachment 114 is divided into four parts: a domain name identifying proxy server 106, namely "https://filecourier.com", a virtual directory path to a dynamic web page generator 400 (FIG. 4, described below) hosted on proxy server 106 in processing software 116, namely "/FC/D/d.aspx", a key variable identifier, namely "FT=", and a key variable, for identifying computer 102 and attachment identifier object 115, which in this example has the value "bbc87c94a19dc19d71990102". For the embodiment, the domain name for proxy server 106, plus the virtual directory path to processing software 116, together forms a uniform resource locator ("URL") to dynamic web page generator 400. Using the URL, computer 104 is able to locate proxy server 106 and establish recipient communications path 120 to proxy server 106 through network 100 via normal TCP/IP Internet communications, by resolving the domain name for proxy server 106 into a TCP/IP address, and also resolving the virtual directory path into a program path to dynamic web page generator 400.

For the embodiment, the key variable is an encrypted string, used to uniquely identify computer 102 and attachment identifier object 115. In the embodiment, the encrypted string is preferably an encrypted binary data structure generated from two 8-byte numbers, with the first 8-byte number based on the MAC address of a network interface card used on computer 102 to connect to network 100, and the second 8-byte number is an unique identifier of attachment identifier object 115. For additional details on the MAC address specification, see IEEE 802.2: General standard for the data link layer in the OSI Reference Model. Further, for security, these two 8-byte numbers may be concatenated together and encrypted to form an encrypted variable length data object using, for example, a symmetric crypto algorithm such as Rijndael. Further still, the resulting encrypted variable length data object may be represented as an ASCII string with two ASCII hexadecimal characters for each data byte. Since attachment identifier object 115 uniquely identifies attachment 110, the key variable included with attachment identifier 114 contains sufficient information to uniquely identifying attachment 110.

The key variable may also be used to provide secured data access between computer 102 and proxy server 106 (FIG. 1). For the embodiment, the key variable used to uniquely identify computer 102 includes the MAC address of a network interface card used on computer 102 to connect to network 100 (FIG. 1). A MAC address is the preferred method of providing security since, unlike an internet protocol ("IP") address, a network interface card's MAC address is encoded directly onto the card and cannot be misidentified or hidden by software programs. Therefore, another computer in network 100 would not be able represent itself as computer 102 to proxy server 106.

For the embodiment, attachment identifier object 115 (FIG. 2) is a data structure comprising the following data fields:

Attachment identifier ID number (field type: 8-byte long integer)
   Attachment type (field type: 4-byte integer)
   Attachment identifier checksum (field type: 4-byte short integer)
   File name (field type: string)
   File size (field type: 8-byte long integer)
   Attachment identifier creation date (field type: date object)
   Attachment identifier expiry date (field type: date object)
   Number of downloads allowed (field type: 4-byte integer)
   Number of downloads completed (field type: 4-byte integer)
   Number of downloads attempted (field type: 4-byte integer)
   Password indicator (field type: Boolean)
   Password (field type: string)
   Description (field type: string)
   Issuer's signature (field type: string)
   Error code (field type: 4-byte integer)
   Error message (field type: string)

The data fields of attachment identifier object 115 are filled when attachment identifier object 115 is generated by transmission program 112 at the same time that attachment identifier 114 is generated (FIG. 1). The data fields attachment identifier ID number, attachment type and attachment identifier checksum contain data values that are generated by transmission program 112. The data value of attachment identifier creation date is set to the current date and time as indicated by a system clock of computer 102. The data fields file name, file size, attachment identifier expiry date, number of downloads allowed, password, password indicator, description, and issuer's signature all contain data that is manually entered by the user at computer 102 through graphical user interface 202. The data value of number of downloads attempted is initially set to zero, and the data value is incremented by transmission software 112 each time an attempt is made to transmit attachment 110 from computer 102. The data value of number of downloads completed is also initially set to zero, and is incremented by transmission software 112 at the end of each successful transmission of attachment 110. The data values in error code and error message are initially blank, and they are updated if and when an error occurs.

Figure 4:
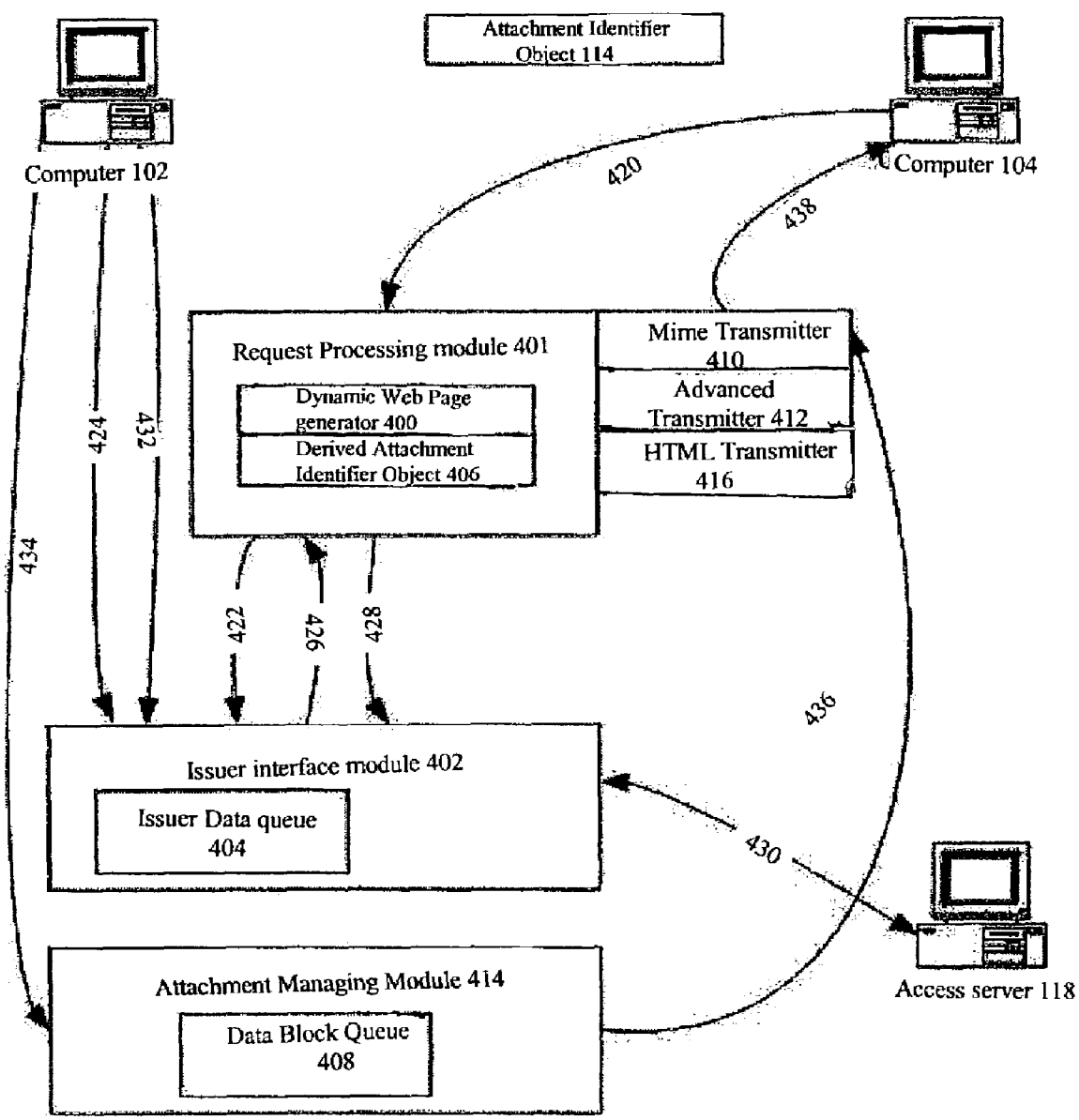
FIG. 4 is a block diagram of an email attachment processing software operating on the proxy server of FIG. 1.

The data fields of attachment identifier object 115 may be updated during transmission of attachment 110 from computer 102 to proxy server 106 through network 100 by derived attachment identifier object 406 (FIG. 4). A derived object may also be created during data transmission between proxy server 106 and computer 104 (FIG. 1), if a web browser program operating on computer 104, described below, utilizes a download control utility (typically a browser plug-in) that supports the use of derived objects. When attachment identifier object 115 is retrieved by proxy server 106 from computer 102, derived attachment identifier object 406 is created within processing software 116. Derived attachment identifier object 406 is a data structure that contains the data fields of attachment identifier object 115, in addition to transmission tracking information fields, including the number of blocks sent, the total number of data blocks to be sent, the block number, and the timestamp of the last data block received. Derived attachment identifier object 406 is used by processing software 116 and transmission software 112 to track the transmission progress of attachment 110 and to facilitate the restarting of an interrupted transmission of attachment 10 between computer 102 and proxy server 106, as described below. As described below, attachment identifier object 406 may be sent to transmission software 112. Therefore, changes to the data fields of derived attachment identifier object 406 may be analyzed by transmission software 112 to update the data fields of attachment identifier object 115.

Since data transmission over issuer communications path 122 is in a sequence of discrete data blocks, the additional information provided by derived attachment identifier object 406 permits processing software 116 to detect a missing data block, and request retransmission of the data block from computer 102, starting from that missing data block. Similarly, if a transmission is incomplete, and no new data block has been received for a specified period of time, then processing software 116 may request retransmission from computer 102, starting from the last data block received. This allows for the data transmission between computer 102 and proxy server 106 to recover from a variety of different transmission interruptions, both physical and logical. This feature is especially important when the data file size of attachment 110 is large. It will be appreciated that if a web browser program operating on computer 104 utilizes a download control utility that supports the use of derived objects, then processing software 116 may also permit data transmissions over recipient communications path 120 to recover from transmission interruptions in the same manner.

Referring to FIGS. 1 and 4, further detail on processing software 116 is provided. Processing software 116 comprises request processing module 401 having dynamic web page generator 400 and derived attachment identifier object 406, issuer interface module 402 having issuer data queue 404, attachment managing module 414 having data block queue 408, MIME transmitter 410, advanced transmitter 412, and HTML transmitter 416. When a request for attachment 110 is received at proxy server 106 from computer 104, as represented by receipt of attachment identifier 114, request processing module 401 invokes dynamic web page generator 400 (step 420). Dynamic web page generator 400 is passed the key variable from attachment identifier 114, which is parsed to obtain information identifying computer 102 and attachment identifier object 115 relative to elements in network 100, and the key variable is also stored in derived attachment identifier object 406. The information identifying computer 102 and attachment identifier object 115 is passed to the issuer interface module 402 (step 422), which references issuer data queue 404 to determine if computer 102 is online and ready to communication (that is, whether server monitor module 208 of transmission software 112 is polling issuer data queue 404). If so, then derived attachment identifier object 406 is placed in issuer data queue 404 for server monitor module 208 to retrieve. As described above, computer 102 then returns attachment identifier object 115 (step 424) to issuer interface module 402, and the information contained in attachment identifier object 115 is used to update dynamic web page generator 400 and derived attachment identifier object 406 (step 426). Through dynamic web page generator 400, information to be entered or validated is displayed to a recipient at computer 104, as described below. Once the recipient provides the required information, such as an access password, derived attachment identifier object 406 is updated and sent to issuer interface module 402 (step 428), which (i) determines if the parameters specified by attachment identifier object 115, as described above, are satisfied, and (ii) contacts access server 118 (step 430) to validate that certain credit and debit conditions of a user account associated with attachment identifier 114 are satisfied. If issuer interface module 402 is satisfied, then derived attachment identifier object 406 updated accordingly and sent to issuer data queue 404 by issuer interface module 402, which is then retrieved by transmission software 112 (step 432). Transmission software 112 then validates the transmission request (step 434) and begins transmitting attachment 110 in discrete, compressed, data blocks to attachment managing module 414 (step 436), as described above. Attachment managing module 414 adds the received data blocks to data block queue 408 and, depending on options selected by a user when email 108, attachment identifier 114, and attachment identifier object 115 were created, invokes one of three possible transmitters (step 436) to deliver attachment 110 to computer 104 (step 438). The three possible transmitters are all associated with dynamic web page generator 400, and the most common transmitter is MIME transmitter 410. MIME transmitter 410 uncompresses the data blocks and utilises the built in MIME capabilities of a web browser program at computer 104 to transmit and store attachment 110 on computer 104. Another possible transmitter to be used is advanced transmitter 412, which requires a browser plug-in control software program to be installed on computer 104. Use of advance transmitter 412 improves transmission compression, server performance and reliability by uncompressing the data blocks in data block queue 408 and utilizing a TCPIP stream socket delivery method to transmit attachment 110 to computer 104. This method is preferred since it avoids greater processing overhead that may be associated with the other transmitter methods. The last transmitter that may be used is HTML transmitter 416, which does not require special software to be installed on computer 104, and uses standard HTML features to display attachment 110 directly in a web browser on computer 104.

Figure 5:
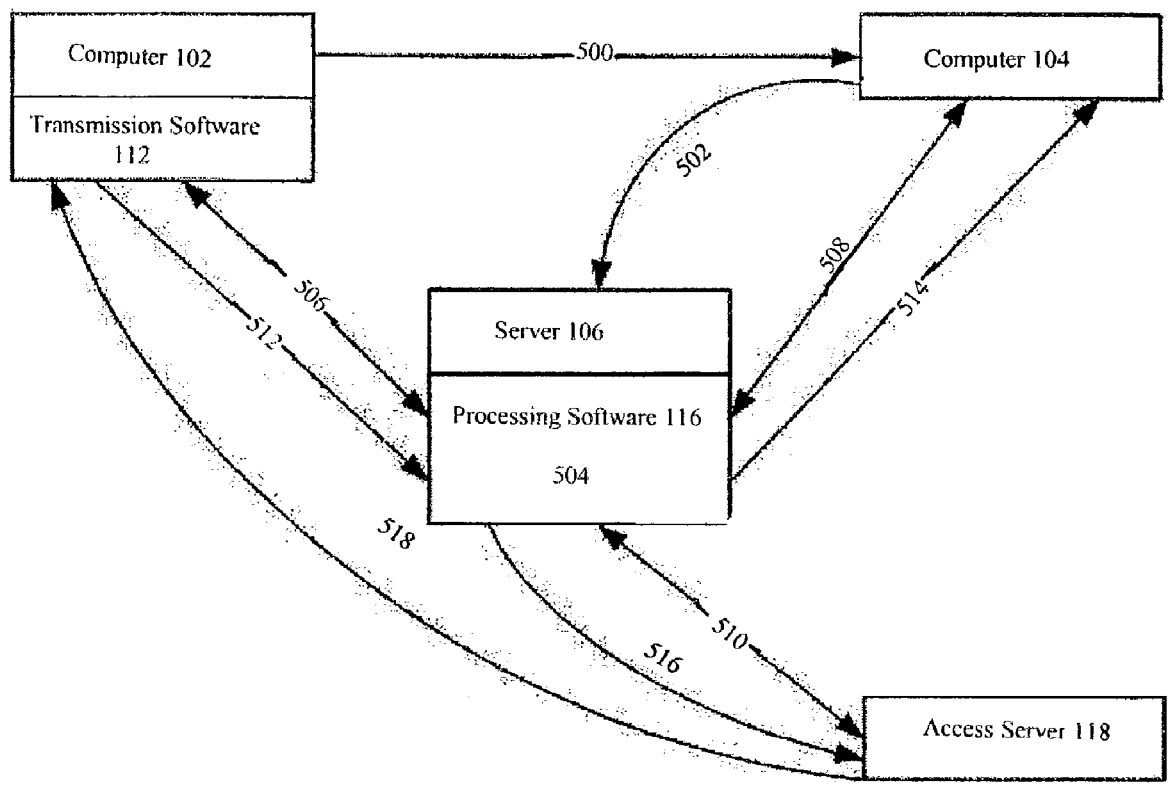
FIG. 5 is a block diagram showing an exemplary email and file attachment transmission between the computers in the network of FIG. 1 using an embodiment.

To illustrate the operation of the described embodiment, referring to FIGS. 1 and 5, details of an exemplary email and file attachment transmission between computer 102 and computer 104 are provided. In step 500, transmission program 112, operating on computer 102, assist in the creation of email 108, which is to be sent with attachment 110, and generates attachment identifier 114 and attachment identifier object 115 with certain parameters, as described above, such as an access password that may be entered through user interface 202 (FIG. 2). Transmission program 112 then attaches attachment identifier 114 to email 108 and stores attachment identifier object 115 into attachment identifier object database 206 (FIG. 2) at computer 102. Email 108, along with attachment identifier 114, is then transmitted through network 100 to computer 104 via known methods of email transmission.

In step 502, using the information contained in attachment identifier 114 (which arrived with email 108), computer 104 establishes recipient communications path 120 to proxy server 106, for example, via a normal Internet connection and a web browser program (not shown) on computer 104, and computer 104 then connects to dynamic web page generator 400 (FIG. 4), hosted on proxy server 106. Other information contained in attachment identifier 114 is also sent to proxy server 106.

In step 504, processing software 116, operating on proxy server 106, parses attachment identifier 114 for information identifying attachment identifier object 115 (FIG. 2), and identifies that attachment 110 as stored at computer 102. Processing software 116 then checks issuer data queue 404, as described above, to determine whether computer 102 is connected to processing software 116. Processing software 116 also contacts access server 118 to determine whether transmission software 112 has previously been cleared for operation, for example, by determining if all licenses are in place and payments are up to date. If transmission software 112 is not connected to processing software 116 or is not cleared for operation, then an error message is displayed at computer 104 through dynamic web page generator 400 (FIG. 4), and the access to attachment 110 stops.

If transmission software 112 is connected to processing software 116 and is also cleared for operation, then in step 506 processing software 116 and transmission software 112 establish issuer communications path 122 between proxy server 106 and computer 102. Transmission software 112 then requests for attachment identifier object 115 (FIG. 2) from computer 102 through issuer communications path 122, and transmission software 112 retrieves attachment identifier object 115 from attachment identifier database 206 (FIG. 2). Attachment identifier object 115 is then transmitted from computer 102 to proxy server 106 through issuer communications path 122.

In step 508, processing software 116 prompts for entry of any parameters that is specified in the data fields of the data structure of attachment identifier object 115 (FIG. 2), such as an access password, as described above, at computer 104 through dynamic web page generator 400 (FIG. 4). As described above, certain parameters specified by the data fields of the data structure of attachment identifier object 115 may not require user input (such as the maximum number of times attachment 110 may be accessed), but may nonetheless need to be satisfied to permit access to attachment 110.

The user input is received by processing software 116 via dynamic web page generator 400 (FIG. 4), and the input and other parameters specified in the data fields in the data structure of attachment identifier object 115 (FIG. 2) are analyzed by processing software 116 to determine if access to attachment 110 may continue. If the parameters specified in the data fields in the data structure of attachment identifier object 115 are not satisfied (such as an invalid password was entered at computer 104, the maximum number of downloads has occurred, or the expiry date has been reached), then processing software 116 returns an error message to computer 104 through dynamic web page generator 400, and access to attachment 110 stops. However, if the parameters specified in the data fields of the data structure of attachment identifier object 115 are all satisfied, then in step 510 processing software 116 communicates with access server 118 again to determine whether the user account associated with attachment identifier 114 has sufficient credits to cover the cost of transmitting attachment 110 from computer 102 to computer 104 through proxy server 106. If sufficient credits are available, then access server 118 authorizes the retrieval of attachment 110. If not, processing software 116 returns an error message to computer 104 through dynamic web page generator 400 (FIG. 4), and the access to attachment 110 stops.

If retrieval of attachment 110 is authorized by access server 118, then processing software 116 requests transmission software 112 for attachment 110. If the request is not validated by transmission software 112, an error message is returned to computer 104 as described above. If the request is validated, then transfer of attachment 110 from computer 102 to computer 104 begins. Using information contained in attachment identifier object 115 (FIG. 2), attachment 110 is identified on computer 102 and transmission software 112, along with processing software 116, transmits attachment 110 from computer 102 to proxy server 106 through network 100 via issuer communications path 122, for example, by way of a HTTP or HTTPS data stream, as described above. At the completion of the transmission of attachment 110, transmission software 112 waits for an acknowledgement of the successful completion from access server 118.

In step 514, processing software 116 redirects attachment 110 to computer 104 through network 100 via recipient communications path 120, for example, by a MIME formatted SSL data stream which is then displayed through dynamic web page generator 400 (FIG. 4) on the web browser program on computer 104.

In step 516, processing software 116 notifies access server 118 through network 100 when transfer of attachment 110 to computer 104 is complete. Access server 118 then debits the user account accordingly, records the transmission of attachment 110 and in step 518, and notifies transmission software 112 of the completion of transmission. Transmission software 112 then records the completed transfer of attachment 110 in attachment identifier database 206.

It will be appreciated that the foregoing are only examples of embodiments of the invention, and that the present invention is not limited to the embodiments described above.

I claim:

1. A system for transmitting a file associated with an email message from an issuer device in a network to a recipient device in the network, the email message and file being generated by the issuer device in response to a request received at the issuer device, the system comprising:

a proxy server in the network in communication with the issuer device and the recipient device;

transmission software operating on the issuer device having an attachment selection module for generating an attachment identifier related to the file and an email for transmission to the recipient device, said attachment identifier identifying the issuer device, a version of the file and a location in the network for the proxy server, and said email having the attachment identifier attached thereto; and an attachment transmission module for forwarding the version of the file towards the recipient device, in response to a transmission request received from the proxy server; and processing software operating on the proxy server having
a request processing module for processing a received request from the recipient device to process the attachment identifier; and
an issuer interface module for generating and sending the transmission request to the issuer device in response to the received request, the transmission request providing the attachment identifier to the issuer device.

2. The system for transmitting a file associated with an email message as claimed in claim 1, wherein
the attachment transmission module forwards the version of the file towards the recipient device via the proxy server, in response to the transmission request received from the proxy server; and
the processing software further comprises an attachment managing module for receiving the version of the file from the issuer device and forwarding the version of the file to the recipient device.

3. The system for transmitting a file associated with an email message as claimed in claim 2, wherein the attachment identifier provides a uniform resource locator to identify the location of the proxy server in the network.

4. The system for transmitting a file associated with an email message as claimed in claim 3, wherein the attachment transmission module utilizes a TCP/IP port which bypasses data security interfaces associated with said issuer device to transmit the file to the recipient device.

5. The system for transmitting a file associated with an email message as claimed in claim 4, wherein the TCP/IP port is selected from a group consisting of port 80 and port 443.

6. The system for transmitting a file associated with an email message as claimed in claim 5, wherein the issuer device connects to the proxy server by a polling transaction through the TCP/IP port.

7. The system for transmitting a file associated with an email message as claimed in claim 6, wherein the attachment identifier is encrypted by the attachment selection module.

8. The system for transmitting a file associated with an email message as claimed in claim 7, wherein the issuer interface module further evaluates a set of access conditions on the file attachment to the recipient device.

9. The system for transmitting a file associated with an email message as claimed in claim 8, wherein the set of access conditions includes at least an access password, download attempt limit and an expiry date.

10. A method for transmitting a file associated with an email message from an issuer device in a network to a recipient device in the network using a proxy server, the email message and file being generated by the issuer device in response to a request received at the issuer device, the method comprising the sequential steps of:

(a) generating an attachment identifier for transmission with the email message to the recipient device, the attachment identifier identifying the issuer device, a version of the file and a location of the proxy server in the network;

(b) receiving at the proxy server a request from the recipient device to process the attachment identifier;

(c) transmitting a request from the proxy server to the issuer device for a copy of the version of the file identified in the attachment identifier; and (d) transmitting the copy of the version of the file from the issuer device towards the recipient device, in response to a transmission request received from the proxy server.

11. The method for transmitting a file associated with an email message from an issuer device in a network to a recipient device in the network using a proxy server as claimed in claim 10, wherein
step (d) comprises transmitting the copy of the version of the file from the issuer device to the recipient device via the proxy server; and
the method further comprises
(e) transmitting the copy of the version of the file from the proxy server to the recipient device.

12. The method for transmitting a file associated with an email message from an issuer device in a network to a recipient device in the network using a proxy server, as claimed in claim 11, wherein the attachment identifier provides a uniform resource locator to identify the address of the proxy server in the network.

13. The method for transmitting a file associated with an email message from an issuer device in a network to a recipient device in the network using a proxy server, as claimed in claim 12, wherein the file is transmitted through a TCP/IP port which bypasses data security interfaces associated with the issuer device.

14. The method for transmitting a file associated with an email message from an issuer device in a network to a recipient device in the network using a proxy server, as claimed in claim 13, wherein the TCP/IP port is selected form a group consisting of port 80 and port 443.

15. The method for transmitting a file associated with an email message from an issuer device in a network to a recipient device in the network using a proxy server, as claimed in claim 14, wherein the attachment identifier is encrypted.

16. The method for transmitting a file associated with an email message from an issuer device in a network to a recipient device in the network using a proxy server, as claimed in claim 15, wherein in the step (e), prior to the transmitting of the copy of the version of the file, access parameters to the copy of the version of the file which were provided by the recipient to the proxy server are evaluated and deemed acceptable by the proxy server.

17. The method for transmitting a file associated with an email message from an issuer device in a network to a recipient device in the network using a proxy server, as claimed in claim 16, wherein the access parameters includes at least an access password, a number of downloads allowed and an expiry date.

* * * * *